3,050,559
SUBSTITUTED PHENYLCYCLOPROPYLAMINES
Alfred Burger, Charlottesville, Va., assignor to Smith Kline & French Laboratories, Philadelphia, Pa., a corporation of Pennsylvania
No Drawing. Filed Sept. 22, 1958, Ser. No. 762,276
3 Claims. (Cl. 260—570.5)

This invention relates to novel substituted phenylcyclopropylamines having valuable therapeutic utility. More specifically, these compounds alter or modify the central nervous system and are useful as ataractic, anti-depressant and hypotensive agents.

The novel substituted phenylcyclopropylamines of this invention are represented by the following general formula:

Formula 1

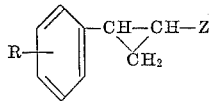

when:
R represents halogen of atomic weight less than 80, preferably chlorine or bromine, or trifluoromethyl; and
Z represents amino, monomethylamino or dimethylamino.

Advantageous compounds of this invention are represented by the following formula:

Formula 2

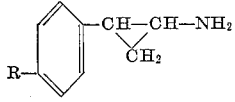

when: R represents chlorine, bromine or trifluoromethyl.
A particularly advantageous compound is trans-2-(4-chlorophenyl)cyclopropylamine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as cis-trans isomers due to the geometrical arrangement of the substituted phenyl and amino moieties with respect to the cyclopropane ring and further as d,l optical isomers. Unless otherwise specified in the specification and the accompanying claims, it is intended to include all isomers, particularly the separated cis or trans isomers and the resolved d- and l-cis or d- and l-trans isomers, as well as the cis-trans mixtures of these isomers.

The novel substituted phenycyclopropylamines of this invention are prepared according to the following synthetic scheme:

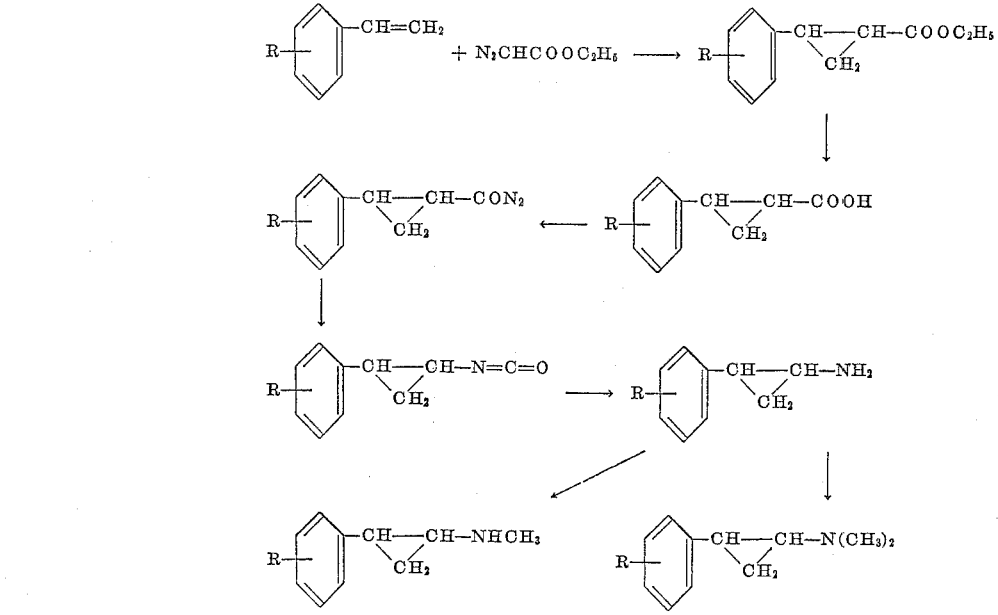

Thus, the appropriately substituted styrene which is prepared by methods known to the art; for example, by decarboxylation of a substituted cinnamic acid, by dehydration of a substituted phenyl methyl carbinol, or by condensation of a substituted benzaldehyde with malonic acid, is condensed with ethyl diazoacetate to give ethyl 2-(substituted phenyl-cyclopropanecarboxylate. The carboxylate is fractionally distilled under reduced pressure to give the cis and trans isomeric carboxylates. The separated ethyl 2-(substituted phenyl)cyclopropanecarboxylates are saponified by refluxing with an aqueous alcoholic solution of an alkali metal hydroxide such as potassium or sodium hydroxide to give the corresponding carboxylic acids. Alternatively, the isomeric mixture of ethyl cyclopropanecarboxylates is saponified as above to give a mixture of the carboxylic acids which are then separated into the cis and trans isomers by fractional recrystallization.

The trans-2-(substituted phenyl)cyclopropanecarboxylic acid is converted to the acid chloride by means of thionyl chloride or phosphorus pentachloride. The trans acid chloride is converted to the azide by heating the reflux in for example a toluene solution with sodium azide. The azide is then subjected to the general reaction conditions employed in the Curtius rearrangement, namely refluxing in an unreactive organic solvent, for example toluene, for several hours to yield the isocyanate. Hydrolysis of the isocyanate by refluxing in a concentrated hydrochloric acid solution yields the trans-2-(substituted phenyl)cyclopropylamine hydrochloride. To obtain the free base the hydrochloride in an aqueous solution is neutralized with dilute alkali, the solution extracted with for example benzene, the extract evaporated in vacuo and the base optionally purified by careful distillation at low temperatures and reduced pressures. The free base is then converted to other acid addition salts of this invention as outlined above.

The separated cis-2-(substituted phenyl)cyclopropanecarboxylic acid is converted to the corresponding cyclopropylamine in an analogous manner. However, the intermediate acid azide is obtained by esterifying the cis acid with diazomethane in an ethereal solution, refluxing the methyl ester with hydrazine hydrate solution in ethanol and diazotizing the hydrazide with hydrochloric acid and sodium nitrite to the azide. The rearrangement of the azide is carried out as above in the presence of methanol to convert after refluxing for several hours the intermediate isocyanate to the methyl urethan which is subsequently hydrolyzed by refluxing with a saturated methanolic solution of barium hydroxide octahydrate to give the cyclopropylamine.

Alternatively, the intermediate trans acid azide is prepared from the trans acid via the hydrazide as described in the above sequence for the cis acid azide.

The N-monomethyl derivatives of the 2-(substituted phenyl)cyclopropylamines are prepared by refluxing the primary amine with benzaldehyde in absolute ethanol, heating the thus formed benzalamine with methyl iodide in a sealed container at from 100° to 150° C. and refluxing the latter reaction product in ethanol for several hours. The dimethylamino derivatives are obtained by methylation of the primary amine with a mixture of aqueous formaldehyde and formic acid.

The N-monomethyl derivatives are alternatively prepared by other advantageous methods. Thus, the intermediate isocyanates obtained as above are reduced by refluxing with lithium aluminum hydride in ether solution to give the N-monomethylamines. Also, the free 2-(substituted phenyl)cyclopropylamines are reacted with ethyl chloroformate to give the N-carbethoxy derivatives which are reduced with lithium aluminum hydride to the N-monomethylamines.

The foregoing is a general description of the main synthetic routes in the preparation of substituted phenylcyclopropylamines. It will be readily apparent to one skilled in the art that variations of these procedures are possible. Of particular advantage as preparative procedure are the methods thoroughly discussed above, namely, conversion of substituted phenylcyclopropanecarboxylic acids to the intermediate acid azides and subsequent rearrangement of the azides to the substituted phenylcyclopropylamines.

The following examples are not limiting but are illustrative of compounds of this invention and the procedures for their preparation and will serve to make fully apparent all of the compounds embraced by the general Formula 1 above and the preparation thereof respectively.

*Example 1*

4-chlorostyrene (48.5 g.) and 70.0 g. of ethyl diazoacetate are mixed carefully at 0° C. The mixture is gradually heated to 160° C. and the exothermic reaction is maintained at this temperature by alternate heating and cooling as required. After the initial exothermic reaction is completed, the mixture is held at 160° C. for four hours. The mixture is distilled under reduced pressure and the fraction, B.P. 126–165° C. at 1–2 mm. is collected. The above fraction is redistilled through a 12″ Vigreaux column to give two fractions, B.P. 121–6° C. at 0.8 mm., which is predominately cis-ethyl 2-(4-chlorophenyl)cyclopropanecarboxylate, and B.P. 136–140° C. at 0.8 mm., which is predominately trans-ethyl 2-(4-chlorophenyl)cyclopropanecarboxylate.

To 7.6 g. of trans-ethyl 2-(4-chlorophenyl)cyclopropanecarboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give colorless needles, M.P. 114–116° C., of trans-2-(4-chlorophenyl)cyclopropanecarboxylic acid.

A mixture of 54.0 g. of trans-2-(4-chlorophenyl)-cyclopropanecarboxylic acid and 75 ml. of thionyl chloride is allowed to stand at room temperature for 20 hours. Excess thionyl chloride is removed in vacuo, the last traces being stripped with benzene. The residue is distilled under reduced pressure to give a colorless oil, B.P. 131–133° C. at 1.4 mm., trans-2-(4-chlorophenyl)cyclopropanecarbonyl chloride.

Technical sodium azide (22.5 g.) is covered with 75 ml. of dry toluene and the mixture is heated gradually while a solution of 18.0 g. of trans-2-(4-chlorophenyl)-cyclopropanecarbonyl chloride in 75 ml. of dry toluene is added slowly over a period of 15 minutes. The mixture is refluxed for three hours, cooled, and the precipitated salts are filtered. The filtrate is evaporated in vacuo to leave the isocyanate as a red oil. The oily isocyanate is cooled and 150 ml. of concentrated hydrochloric acid is added. The mixture is stirred and refluxed for 20 hours. The resulting solution is concentrated in vacuo to give a crystalline residue of the hydrochloride salt. Recrystallization from ethanol-ether affords colorless crystals, M.P. 192–195° C., of trans-2-(4-chlorophenyl)cyclopropylamine hydrochloride.

The free base is liberated from the above hydrochloride salt by neutralizing an aqueous solution of the salt with dilute alkali, extracting with benzene and evaporating the benzene extract to give the residual trans-2-(4-chlorophenyl)cyclopropylamine which may be purified further by careful distillation at reduced pressures.

The free base is also converted to the succinate salt by reacting it in ether with a saturated ethereal solution of succinic acid.

*Example 2*

4-bromostyrene (18.3 g.) and 20.0 g. of ethyl diazoacetate are mixed carefully at 0° C. The mixture is heated gradually to 160° C. and maintained at that temperature for six hours. The mixture is then distilled under reduced pressure and the main fraction consisting of ethyl 2-(4-bromophenyl)cyclopropanecarboxylate is collected.

A mixture of 26.9 of ethyl 2-(4-bromophenyl)cyclopropanecarboxylate, 20.0 g. of potassium hydroxide, 20 ml. of water and 90 ml. of 95% ethanol is heated at reflux for four hours. The solvents are removed in vacuo to give a solid residue. The residue is dissolved in water and the solution adjusted to pH 1 with concentrated hydrochloric acid to give a precipitate. The filtered solid is recrystallized from water to give trans-2-(4-bromophenyl)cyclopropanecarboxylic acid.

The mother liquor from the above aqeuous recrystallization is concentrated in vacuo to give the cis-2-(4-bromophenyl)-cyclopropanecarboxylic acid.

An ethereal solution of diazomethane is added in portions to a suspension of 10.0 g. of cis-2-(4-bromophenyl)-cyclopropanecarboxylic acid in 150 ml. of absolute ether, until a yellow color persists. After standing at room temperature for 24 hours, the excess diazomethane is decomposed by addition of ethereal hydrogen chloride. The dried ethereal solution is concentrated in vacuo to yield cis-methyl 2-(4-bromophenyl)cyclopropanecarboxylate.

To a solution of 10.5 g. of the above methyl ester in 20 ml. of absolute ethanol, is added 100 ml. of 100% hydrazine hydrate and the mixture refluxed for five hours. After standing for 18 hours at room temperature, the solution is concentrated in vacuo to give the residual cis-2-(4-bromophenyl)cyclopropanecarboxylic acid hydrazide.

The above hydrazide (12.7 g.) is dissolved in 250 ml. of 5% hydrochloric acid and a solution of 3.5 g. of sodium nitrite in 40 ml. of water is added slowly, with the temperature maintained at 0° C. The cooled solution is extracted with toluene and the combined extracts dried and concentrated in vacuo. Absolute methanol (250 ml.) is added to the toluene solution and the solution refluxed for five hours. The solvents are removed in vacuo to give the residual cis-2-(4-bromophenyl)cyclopropylmethyl urethan.

The above methyl urethan (13.5 g.) and 600 ml. of a saturated methanolic solution of barium hydroxide octahydrate is refluxed for 36 hours. The mixture is cooled to 0° C., filtered and the filtrate concentrated to dryness in vacuo. The oily residual primary amine is dissolved in absolute ether and the solution treated with anhydrous hydrogen bromide gas to yield cis-2-(4-bromophenyl)cyclopropylamine hydrobromide.

The oily primary amine obtained above is also dissolved in ethyl acetate and reacted with an ethyl acetate solution of maleic acid to furnish cis-2-(4-bromophenyl)-cyclopropylamine maleate.

*Example 3*

A solution of 8.4 g. of trans-2-(4-chlorophenyl)cyclopropylamine (prepared as in Example 1) and 5.6 g. of benzaldehyde in 20 ml. of absolute ethanol is heated at reflux for four hours. The solvent is removed in vacuo to yield the benzal derivative.

A mixture of 7.7 g. of trans-2-(4-chlorophenyl)-cyclopropylbenzalamine and 8.6 g. of methyl iodide is heated in a sealed tube at 100° C. for eight hours. The reaction product is heated then with 100 ml. of 95% ethanol for four hours and the solvent removed in vacuo. The base is liberated with 40% potassium hydroxide solution and extracted with ether. The dried ether extract is evaporated to give the residual trans-2-(4-chlorophenyl) cyclopropyl methylamine.

An ethereal solution of the free base is treated with ethereal hydrogen chloride to yield the hydrochloride salt.

*Example 4*

A 40% aqueous solution of formaldehyde (5.1 g.) is added to a cooled solution of 4.2 g. of cis-2-(4-bromophenyl)cyclopropylamine (prepared as in Example 2) in 6.6 g. of 90% formic acid, and the mixture refluxed for 18 hours. The cooled reaction mixture is treated with 2.7 ml. of concentrated hydrochloric acid and the solution evaporated in vacuo. The residue is made alkaline with 50% potassium hydroxide solution and the solution extracted with ether. The dried ether extracts are evaporated to give the residual cis-2-(4-bromophenyl)cyclopropyldimethylamine.

The free base dissolved in ethyl acetate is added to a solution of mandelic acid in ethanol. Concentration of the resulting solution and cooling yields the crystalline cis-2-(4-bromophenyl)cyclopropyldimethylamine mandelate.

*Example 5*

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl) cyclopropanecarboxylate.

A solution of 11.5 g. of potassium hydroxide in 12 ml. of water and 50 ml. of 95% ethanol is added to 17.6 g. of ethyl 2-(4-trifluoromethylphenyl)cyclopropane-carboxylate. The solution is refluxed for four hours and worked up as described in Example 2 to give after fractional recrystallization the separated isomeric cis- and trans-2 - (4 - trifluoromethylphenyl)cyclopropanecarboxylic acids.

Following the general procedure outlined in Example 2, trans-2-(4-trifluoromethylphenyl)cyclopropanecarboxylic acid is esterified with an ethereal solution of diazomethane; the methyl ester converted to the acid hydrazide with 100% hydrazine hydrate in ethanol; the hydrazide diazotized and decomposed by heating in a toluene-methanol solution to the methyl urethan; and the urethan hydrolyzed with a saturated methanolic solution of barium hydroxide octahydrate to yield trans-2-(4-trifluoromethylphenyl)cyclopropylamine.

The primary amine obtained as above is dissolved in absolute ether and treated with ethereal hydrogen chloride to give trans-2-(4-trifluoromethylphenyl)cyclopropylamine hydrochloride.

What is claimed is:

1. A chemical compound selected from the group consisting of a trans-2-phenylcyclopropylamine free base of the formula:

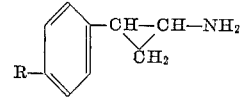

in which R is a member selected from the group consisting of chlorine, bromine and trifluoromethyl, and addition salts thereof formed with nontoxic pharmaceutically acceptable acids.

2. Trans - 2 - (4 - trifluoromethylphenyl)cyclopropylamine.

3. Trans-2-(4-chlorophenyl)cyclopropylamine.

References Cited in the file of this patent

UNITED STATES PATENTS

| | | |
|---|---|---|
| 2,709,700 | Szabo et al | May 31, 1955 |
| 2,735,848 | Edgerton et al. | Feb. 21, 1956 |

OTHER REFERENCES

Bunce et al.: Jour. of the Amer. Chem. Society, vol. 76; p. 2248 (1954).

Burger et al.: Jour. of the Amer. Chem. Soc., vol. 74; p. 3415 (1952).

Burger et al.: Jour. of the Amer. Chem. Soc., vol. 70; p. 2199 (1948).